Figure 1:
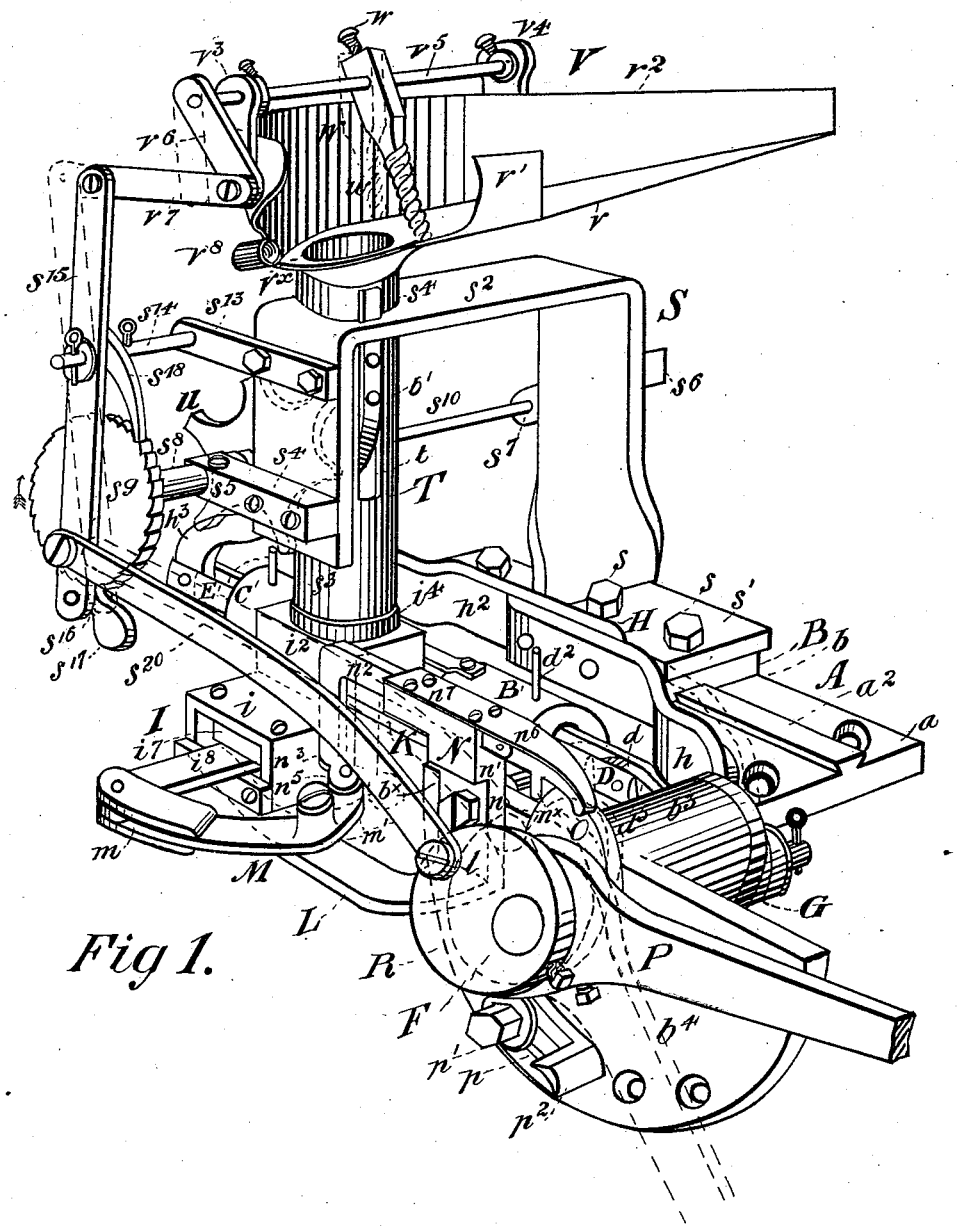

(No Model.) 3 Sheets—Sheet 1.

H. C. PFEIFFER.
COMBINED NUT CRACKING AND FEEDING MACHINE.

No. 563,308. Patented July 7, 1896.

WITNESSES:

INVENTOR
Henry C. Pfeiffer
BY
Rich'd H. Manning
ATTORNEY

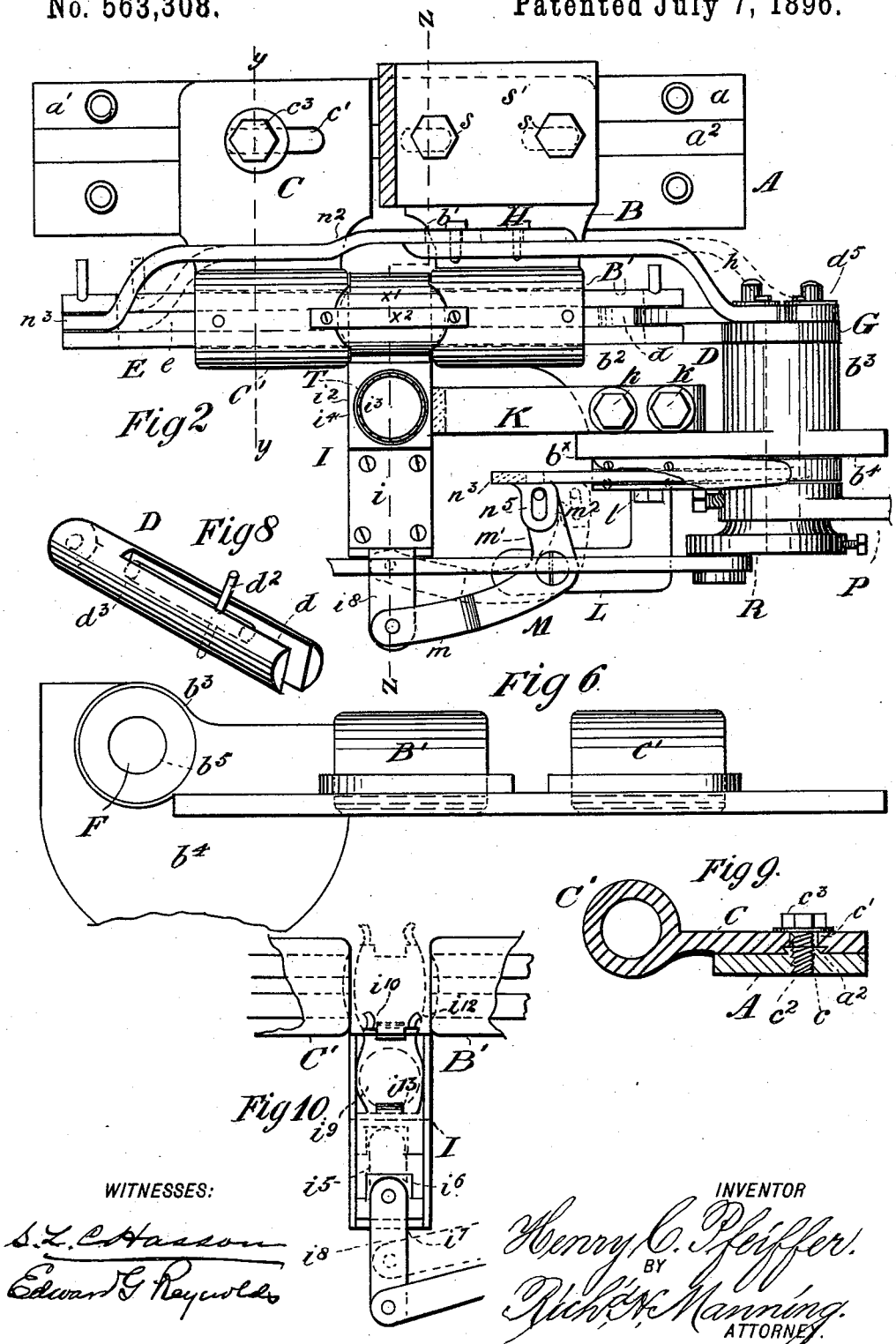

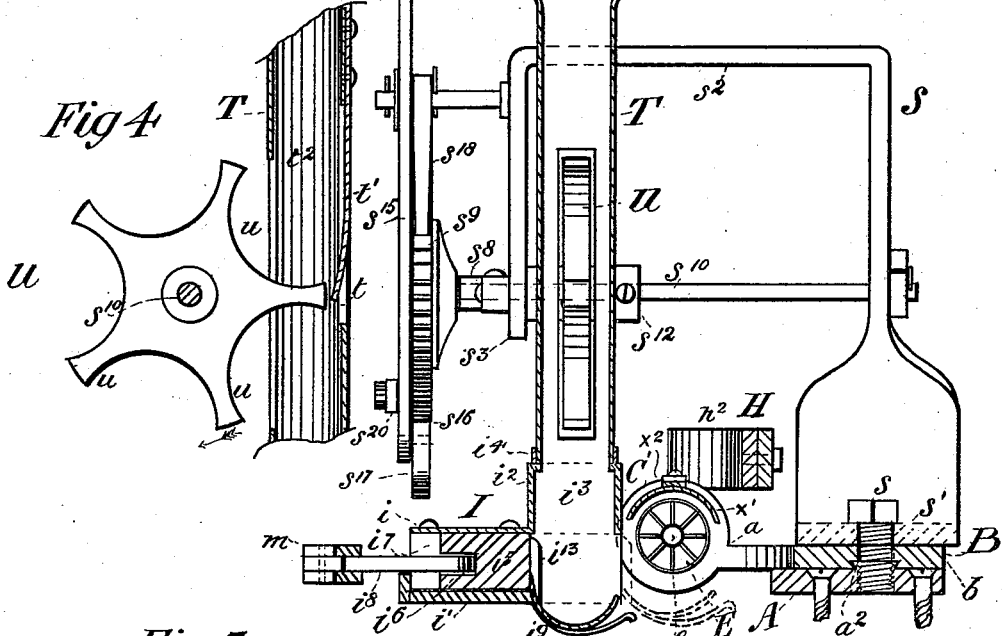

UNITED STATES PATENT OFFICE.

HENRY C. PFEIFFER, OF KANSAS CITY, MISSOURI.

COMBINED NUT CRACKING AND FEEDING MACHINE.

SPECIFICATION forming part of Letters Patent No. 563,308, dated July 7, 1896.

Application filed November 29, 1895. Serial No. 570,444. (No model.)

*To all whom it may concern:*

Be it known that I, HENRY C. PFEIFFER, a citizen of the United States, residing at Kansas City, in the county of Jackson and State of Missouri, have invented a certain new and Improved Combined Nut Cracking and Feeding Machine; and I do hereby declare that the following is a full, clear, and exact description of the invention, such as will enable others to make and use the same, reference being had to the accompanying drawings, forming a part of this specification.

The objects of my invention are, first, to cause the crushing force upon the nut to approach from opposite directions and lessen the injury to the kernel of the nut; second, to transmit the nuts automatically from the hopner to the nut-cracking jaws; third, to regulate the width of space between the jaws; fourth, to throw the nuts into position for cracking.

My invention consists in the novel construction and combination of parts such as will first be fully described, and specifically pointed out in the claims.

In the drawings, Figure 1 is a view in perspective of the improved nut cracking and transmitting machine, with a portion of the hopper broken away to show the nut-agitator, the passage for the nuts, and the dust-vent. Fig. 2 is a plan view in detail of the bed of the machine, showing the stationary uprights for the shaft-bearing and the vertical tube in section, also showing the nut-cracking plungers or jaws and connections and the operating mechanism for thrusting the nut-carrier beneath the jaws. Fig. 3 is a vertical sectional view in detail, taken at right angles to the bed of the machine and also through the vertical tube and hopper, showing the end of one of the nut-cracking jaws, the nut-carrier, the rotary wheel with depressions for nuts, and the ratchet-wheel and pawls, the agitating-bar in the hopper, and the crank-shaft and connecting-bars extending from the eccentric plate to the crank-shaft. Fig. 4 is a detail vertical sectional view of the nut-conveying tube as seen in Fig. 1, showing the wheel and its depressions and the spring engaging the portion of periphery of the wheel upon one side of one of the depressions. Fig. 5 is a detail view of the sleeves or bearings, the nut-cracking jaws, and the disk on the power-shaft, taken from a position in rear of said cylinder, showing the connecting-bar on the disk extending to the plunger and the pivotal arm on said disk connected with the other jaw. Fig. 6 is a view of the sleeves or bearings from the position as seen in Fig. 5, with the disk connecting-arm and plungers removed. Fig. 7 is a horizontal sectional view of the sleeves or bearings and the nut-cracking plungers and jaws, taken on the line X X of Fig. 5. Fig. 8 is a detail view in perspective of one of the plungers. Fig. 9 is a sectional view of the bed and adjustable plate, taken on the line $y\ y$ of Fig. 2. Fig. 10 is a horizontal sectional view of the guide-case beneath the vertical nut-conveying tube, showing the nut carrier and guard thrown forward in position beneath the opening between the adjacent ends of the sleeves, also showing the adjacent broken ends of the sleeves with the cap or hood removed.

Similar letters of reference indicate corresponding parts in all the figures.

A represents the bed of the machine, which consists of a rectangular-shaped plate of suitable width. Upon the upper surface of the bed-plate A is a dovetail bar or guide $a^2$, extending the entire length of said plate and attached to said plate at a point nearly equidistant from the longitudinal edge portions. Upon the upper surface of the plate A, in the direction of the end of said plate, is an adjustable plate B, comparatively short in length, and in the under surface of said plate is a longitudinal dovetail groove $b$, which receives the guide-bar $a^2$ on the plate A. To the outer edge portion of the plate B is attached rigidly the longitudinal outer side portion of a jaw-bearing B′, which consists of a hollow cylinder or sleeve considerably shorter in length than the plate B, and connected with said plate at a point below the line of its axis, extending horizontally through the cylinder. A portion of the end of the plate B describes a curved line from said end to the end of the cylinder, thus forming a recess $b^t$. To the outer side and rear end portion of the sleeve B′, above the axis of said cylinder, is rigidly attached a narrow plate $b^2$, which plate extends rearwardly in a plane parallel with and in the direction described by the end $a$ of said plate A, and nearly the same distance. To the end portion of the plate $b^2$ is attached rigidly a cylindrical bearing $b^3$, which is connected with said plate above the line of its axis, extending horizontally through said bearing. To the outer cylindrical surface $b^3$, and in line with the outer end of said bearing, is attached rigidly a flat plate $b^4$, the lower edge describing an arc of a circle and the upper end extending longitudinally at $b^4$ in the direction described by the sleeve B' and nearly opposite thereto. In a transverse direction to plate $b^2$ and in the bearing $b^3$ is a shaft-opening $b^5$, for the purpose hereinafter described, the respective plates B $b^2$ $b^4$ and the shaft-bearing $b^3$ and sleeve B' being cast in one piece. In the direction of the other end $a'$ of the bed A is an adjustable plate C, which is of the same length as plate B, and in the under side portion thereof is a dovetail slot $c$, which receives the longitudinal guide-bar $a^2$. In the plate C is a slot $c'$.

In the bed A, and extending through the guide-bar $a^2$, is a screw-threaded opening $a^3$, in which is a screw-threaded bolt $c^2$, which extends through the slot $c'$ in the plate C and is provided with a bolt-head $c^3$. On the outer edge portion of the plate C is a cylinder C', which is attached to said plate in precisely the same manner as described of the sleeve B', said sleeves being arranged in position a short distance apart.

The nut-cracking jaws consist of cylindrical plungers which fit within the respective sleeves or bearings B' C'. In the sleeve B' is fitted the plunger D, in which is the longitudinal slot $d$, extending from one end to within a short distance of the other end of said plunger. In the slot $d$ in the plunger D is a fixed rod $d'$, which extends the described length of the sleeve or bearing B and is secured in position by a pin $d^2$, which extends through the cylinder B' and also through the rear end of said rod. The forward end of the said rod extends through an opening $d^3$ in the portion of the plunger beyond the slot $d$. In the extreme forward end of the plunger D is a concavity $d^4$. (See Fig. 6.) In the sleeve or bearing C' is a plunger E, which is constructed precisely the same as the plunger D, the normal position of the concave end portions of the plungers being within the cylinders, as seen in Fig. 6, and the ejecting-rods $d$ and $e$ projecting outwardly to a position in line with the vertical faces of the respective sleeves B' C'.

In the bearing $b^3$ on the plate $b^2$ and in shaft-opening $b^5$ is a shaft F. To one end of shaft F, which lies in the plane of the bed of the machine, is attached a disk G. To the outer face of the disk G and near its periphery is pivoted one end of the connecting-bar H. This bar is composed of two separate pieces, the end portion $h$, which is pivoted to the disk G, being bent rearwardly from its point of connection and laterally from the sleeve B in an outwardly-curved line, thence extended in the longitudinal direction of the bed-plate A, and terminating at a point nearly equidistant from each end of said bed-plate. The other portion of the bar H overlaps the terminal of the portion $h$ and is slotted at $h^\times$ and bolted thereto at one end by the adjusting-bolts $h^2$, which pass through the slots and into the end $h$ of said bar. The other end $h^3$ of said portion of the bar is extended in nearly a direct line with the portion to which it is attached, to a position near the outer end of sleeve C', and is then bent in a curved line inwardly to a position above the outer end of plunger E, and thence extended downwardly in an outwardly-curved line within the slot $e'$ of the plunger E and pivoted to said end of said plunger. To the outer face of the disk G, beneath the pivotal end portion of the bar H, and at a point near the periphery of said disk, eccentric in position to the pivot connecting said bar, is pivoted one end of a short arm $d^5$, the other end of which arm is pivoted to the outer end of the plunger D in the slot $d$.

Extending at right angles to the sleeves B' C', and in a direction outwardly from the outer side portion of said cylinder, is an extended box or case I, which is nearly of the same height and width as the opening between the adjacent end portions of the sleeves B' C'. A portion of the top $i$ is removed from the case extending from the end near the sleeves B' C' about one-half the described distance toward the other or outer end. A portion of bottom $i'$ of said case is also removed extending from the sleeves B' C' the same distance as from top $i$. Upon the upper side of the case I, above the opening formed by the removal of the top of said case, is rigidly attached a case $i^2$, of the same width as the case I, and extended from the end of the case I, near the sleeves B' C', the same distance in the direction of the other end of said case as described by the opening in the top $i$. The said case is inclosed on all sides, and is provided with an opening in the bottom portion, of the same proportions as the opening in the top of said case I. In the top of the case $i^2$ is a circular opening $i^3$. Upon the upper side portion of the top and extending around the opening $i^3$ is a circular flange $i^4$. In the case I is a reciprocating guide-block $i^5$, in the outer end of which is a recess $i^6$. In the outer end of the case I is an opening $i^7$. To the block $i^5$ in the recess $i^6$ is pivoted one end of a bar $i^8$, the other end of which bar extends through the opening $i^7$ and a short distance beyond said opening.

To the end of the block $i^5$, extending toward the opening between the sleeves B' C' and the lower edge of said block, is rigidly attached a curved carrier-plate $i^9$, which in shape is similar to a spoon. To the under side portion of the plate $i^9$, upon one side of said plate near block $i^6$, is attached one end of a spring-finger $i^{10}$, the other end of which finger extends a short distance beyond the forward end of the plate $i^9$. Upon the other side of said plate is attached a spring-finger $i^{12}$, in the same manner as the finger $i^{10}$. On the upper edge of the block, above the plate $i^9$, is a lug $i^{13}$, which retards the upper movement of the nut.

The case I is secured in position by means of a strap K, which is bolted at one end by bolts $k\,k$ to the upper side of the plate $b^2$, and the other end extended downwardly to the lower portion of the adjacent side of said case and secured rigidly thereto. (See Fig. 2.)

To the portion $b^\times$ of the plate $b^4$, attached to the bearing $b^3$, is bolted at $l$ one end of a lever support or brace L, the other end of which brace extends downwardly a short distance in a curved line, thence horizontally in the direction of the under side portion of bar $i^3$, in the case I, to a point a considerable distance from said case. Upon the outer end of said support L is pivotally attached a bellcrank lever M, one end of which is forked at $m$ and pivotally connected with the outer end of the bar $i^3$, and the other end $m'$ extended inwardly a short distance in the direction of the sleeve B'. To the end of the supporting-brace L, above the bolt $l$, is connected rigidly the foot portion $n$ of a guide-plate N.

In the upper portion of the plate N is a horizontal slot $n'$, in which is a reciprocating bar or lever $n^2$, one end $n^3$ of which lever is bent at an angle and extends downwardly to a position opposite the portion $m'$ of the bellcrank lever M. On the lower end portion $n^3$ of bar $n^2$ is a laterally-extended slotted plate $n^5$, and on the portion $m'$ of the bell-crank lever is a pin $m^2$, which extends into the slot in said plate. To the other end of the bar $n^2$ in the slot $n'$ is pivotally attached an arm $n^6$, the outer end of which arm is curved downwardly and forked, as at $n^\times$. Upon the upper side portion of the guide-plate N, and covering the slot $n'$, is bolted one end of a spring $n^7$, which consists of a plate, the other end extending nearly to the outer end of the pivoted arm $n^6$ and bearing upon the upper surface of said arm.

To the end of shaft F, which extends a considerable distance outside of the plate $b^4$, is rigidly attached a cam O, which engages with the forked end of the arm $n^6$. On said shaft, outside of the cam O, is attached rigidly an operating-lever P. On the lower end portion of plate $b^4$, beneath the shaft F, is a curved slotted plate $p$, held adjustably by the screw-bolt $p'$, on which plate is a lug $p^2$, which limits the downward movement of the lever P. On the shaft F, outside of the lever P, is rigidly attached, eccentrically, a plate R, for the purpose hereinafter described.

Upon the upper surface of the plate B, on the bed A, is secured firmly by the bolts $s\,s$ one end $s'$ of a plate or standard S, said bolts also passing through the plate B and bearing on the upper surface of the guide $a^2$. Said standard extends upwardly to a considerable height above the bed A, being given an outward twist to bring the same in alinement with the vertical line of the outer edge of plate A, and a portion $s^2$ bent at right angles and extended in a transverse direction to the machine to a position above the case $i^2$ in the case I, and a portion $s^3$ bent at right angles and extended downwardly to a point a considerable distance above said case $i^2$. In the upper horizontal portion $s^2$ of the support or standard S, near the downwardly-extended portion $s^3$, is an opening $s^4$. In said opening is inserted one end of a vertical tube T, which extends downwardly and fits within the circular collar $i^4$ in the upper side of the case $i^2$. The other end of the tube T extends a short distance above the upper side of the horizontal portion of the support S. In the central portion and side of tube T, above the sleeve B', is a vertical slot $t$. To the outer side and upper end portion of the tube T is attached rigidly a spring $t'$, the lower end of which spring extends within the slot $t$ a short distance. In the other side of the tube T is a vertical slot $t^2$, extending downwardly nearly to case $i^2$. To the outer side of the portion $s^3$ of the support S and near the lower end of said portion is bolted a horizontal bar $s^4$, which bar extends a short distance beyond the outer edge of the support $s^3$ in the direction described by the sleeve C', and is perforated at $s^5$.

To the outer side portion of the standard S, extending down plate B, is secured rigidly a bar $s^6$, which is perforated at $s^7$. In the perforation or bearing $s^5$ of the bar $s^4$ is journaled a hollow shaft $s^8$, which extends in one direction a short distance beyond the outer side portion of the bar $s^4$, and to said end is rigidly attached a ratchet-wheel $s^9$. Said shaft $s^8$ extends in the other direction to a position opposite the adjacent side of the slot $t^2$ on the tube T. In said hollow portion of shaft $s^8$ is inserted and secured rigidly one end of a shaft $s^{10}$ of reduced diameter, the other end being journaled in the bar $s^6$ in the vertical support S. On the shaft $s^{10}$ is mounted a wheel U, in the periphery of which are inwardly-curved depressions $u$, each depression being of the proper size to receive the separate nut to be cracked. The periphery of said wheel extends within the slot $t^2$ of the tube T and to a position near the slot $t$ in said tube and in contact with the lower end of spring $t'$, said depressions $u$ being arranged at equal distance apart and in series upon the said periphery. Upon shaft $s^{10}$ is an adjustable collar $s^{12}$, which binds the wheel U against the end of the hollow shaft $s^8$.

Above the bar $s^4$, and bolted to the portion $s^3$, is a horizontal bar $s^{13}$, which extends in the same direction as the bar $s^4$ and a corresponding distance. In the end of bar $s^{13}$ is a laterally-extended fixed rod $s^{14}$, which is directly above the ratchet-wheel $s^9$. To the outer end of the rod $s^{14}$ is pivotally attached an oscillating vertically-arranged bar $s^{15}$. One end of said bar extends in an upward direction a considerable distance, and the other end in a downward direction outside of the ratchet-wheel $s^9$ and to a point a short distance below the lower edge of said wheel. To the inner side of said bar $s^{15}$, at said lower end of bar $s^{15}$, is pivotally attached a pawl $s^{16}$, to the free end of which is attached a weight $s^{17}$, the other end engaging with the ratchet-wheel. To the inner side of the bar $s^{15}$, above the rod $s^{14}$, is pivoted a pawl $s^{18}$, which engages the wheel $s^9$. To the outer side portion of the bar $s^{15}$, a short distance above the pivotal point of the pawl $s^{16}$, is pivotally attached one end of a connecting-arm $s^{20}$, the other end of which arm is pivotally connected with the outer side portion of the eccentric plate R on the shaft F.

To the upper end portion of the tube T is connected a hopper V. Said hopper consists of a flat bottom $v$, which is perforated at $v^x$, near one end of said hopper, and the other end extended in the direction described by the operating-lever P, and inclined in an upward direction, at an angle to the tube T. The sides $v'$ $v^2$ to said hopper extend in a vertical direction along both sides of said hopper and across the end of the hopper lowest in position. To the outer portion of the side $v'$ is attached a shaft-bearing $v^3$, and to the other side of said hopper $v^2$ is attached a bearing $v^4$. In the bearing $v^4$ is journaled one end of a rock-shaft $v^5$, the other end of which shaft extends through the bearing $v^3$ in a transverse direction to the hopper V and a short distance beyond the outer side portion of said hopper, and to said end is connected rigidly one end of a crank $v^6$.

To the lower end of the crank $v^6$ is pivotally attached one end of a connecting-bar $v^7$, the other end of which bar is pivotally connected with the upper end of the oscillating bar $s^{15}$. On the shaft $v^5$ is an adjusting-bar W, which is perforated at its upper end to receive the shaft $v^5$. In said end of said bar W is an adjusting-screw $w$, which binds against the shaft $v^5$ and by means of which the agitator is adjusted in position. To the lower end of bar W is attached one end of a coiled spring $w'$, the lower end of said spring extending nearly to the bottom $v$ of the hopper. In the lower end portion of the hopper V, beyond the opening to the tube T, is a dust-spout $v^8$.

In the space above the plungers D E is an outwardly-curved plate or hood $x'$. Said plate is secured in position by an outside curved strip $x^2$, one end of which is secured to and extends from the upper side and inner end portion of the sleeve B' to the upper side and adjacent end portions of the sleeve C', said plate $x'$ being braced to the under side portion of the strips $x^2$.

In the operation of the machine the nuts are placed indiscriminately in the hopper V, in sufficient quantity, a few of which enter the tube T, the lower one of said nuts falling into the depression $u$ in the wheel U. In the position as shown in full lines of the operating-lever P the plungers D E are retracted in position, and also the nut-carrier $i^9$ and guide-block $i^5$, the portion of the periphery of the wheel U being retarded by the spring $t$, so that one of the depressions in the wheel forms a movable or shifting bottom to the tube. The lever P is then operated in an upward and downward direction repeatedly, and in each downward stroke coming into contact with the lug $p$ on plate $b^4$. In this movement the eccentric plate R draws rearwardly the connecting-bar $s^{20}$ and oscillates the bar $s^{15}$. The pawl $s^{16}$, which by the weight $s^{17}$ is kept in contact with the ratchet-wheel $s^9$, moves said wheel in the direction indicated by the arrows in Fig. 1, thereby moving the portion of the wheel U on shaft $s^8$ from engagement with the spring $t'$ in slot $t$ and reversing the position of the depression $u$, containing the single nut, which nut falls into the case $i^2$ and upon the carrier $i^9$. The spring $t$, meeting the portion of the periphery in the other side of the depression $u$, checks the movement of the wheel. In passing the spring $t$ the position of the nut is adjusted so as to place the same in a position corresponding to the axis of the wheel. As soon as the one depression $u$ has been partially rotated to throw a nut into the carrier $i^9$ another depression is brought into position in the tube T, and into which another nut falls. In the movement of the ratchet-wheel U the pawls $s^{16}$ $s^{18}$ act simultaneously. In the movement of lever P downward by the pivoted forked arm on the lever $n^2$, which engages with the cam $o$, acts at a period of time antecedent to the movement of the eccentric plate R, drawing said lever $n^2$ and the end $m'$ of the bell-crank lever rearwardly and thrusting the guide-block $i^5$ in the opening beneath the case $i^2$ and closing the passage beneath said case, also thrusting the carrier forward to a position a slight distance below the adjacent ends of the sleeves D E and directly beneath the jaws of the plungers when thrust toward each other. As soon as the carrier $i^9$ has completed its movement and brought the nut into a position between the opposing ends of the plungers D E the disk G, which is also operated in the same movement of lever P, describes the short distance traversed in the movement of the long arm H, making a slower movement compared with the action of the cam O, and the action of the plungers in approaching each other is subsequent to the advance of the carrier containing the nut, said nut being within the space between the jaws which move toward each other, the ends of the nut entering the concavity in the ends of the said jaws are prevented from upward movement by the carrier-plate $x'$ and an equal endwise pressure is maintained upon them, so that the crushing force breaks the shell at a point equidistant from the ends of the nut and the kernel is separated with comparatively little injury. As soon as the jaws have approached each other sufficient to crack the shell of the nut the plungers D E are retracted in position and past the outer ends of the rods $d$ and $e$, which extend within the cavity of each jaw of the plungers D and E and eject the portions of the shells of the nut which may remain in the cavity after the nut has been cracked. The carrier $i^9$ is then retracted in position, opening the passage, into which another nut falls, from a depression in the wheel U, upon the carrier $i^9$, and this operation is repeated during the operation of the lever P. Simultaneously with the movement of the oscillating bar $s^{15}$ the movement of the upper end of said bar is communicated to the crank-shaft $v^5$ and the agitator-bar W, the lower end of which moves backward and forward above the opening in the tube T and causing the nuts to move toward the tube without clogging. When the movement of the plungers D E are required to approach each other, so as to lessen the space between the jaws in cracking a small nut, the adjusting-bolt $p'$ is loosened and the plate moved forward, which gives the lever P more space in which to move in a downward direction.

For the purpose of increasing the width of space between the nut-cracking jaws independently of the operating-lever the adjusting-nuts $h^2$ are released and the connected portions of the bar H drawn in opposite directions the slight distance to effect the desired position of the jaws. At the same time the adjusting-nuts $c$ of the plate C are loosened, and also the adjusting-nuts $s'$ $s'$ of the plates $s$, whereby the respective plates are enabled to be moved and also the sleeves B' C', so as to bring the ends of each one of the retracted plungers in line with the end portions of the separate sleeves.

The nuts supplied to the hopper V are preferably assorted, and as soon as cracked and the jaws are retracted in position the cracked nuts fall into a receptacle beneath provided for the purpose, in which condition they are supplied to the market and the kernels removed.

Having fully described my invention, what I now claim as new, and desire to secure by Letters Patent, is—

1. In a nut-cracking machine, the combination with a suitable bed-plate of sleeves arranged in a horizontal endwise position, and provided with power-actuated plungers and supporting-plates for said sleeves, adjustably connected with said bed-plate, substantially as shown and described.

2. In a nut-cracking machine, the combination with a suitable bed-plate having a longitudinal guide-bar in the upper surface of said plate; of sleeves arranged in a horizontal endwise position, and provided with power-actuated plungers and supporting-plates for said sleeves, having grooves on the under side thereof adapted to receive the guide-bar on said bed-plate and suitable adjusting-bolts, as shown and described.

3. In a nut-cracking machine, the combination with a suitable bed-plate of sleeves arranged in a horizontal endwise position, nut-cracking plungers or jaws in said sleeves, and separate arms varying in length, one of said arms being pivotally connected at one end with the outer end of one of said plungers, and the other arm extending a like distance and direction at one end, and the other end extending in the longitudinal direction of the said sleeves and bent at an angle and pivotally connected with the other plunger and an operating-lever connected with each arm, as and for the purpose described.

4. In a nut-cracking machine, the combination with a suitable bed-plate of sleeves arranged in a horizontal endwise position, nut-cracking plungers in said sleeves, a power-shaft on said bed, and a disk on said shaft, separate arms varying in length, one of said arms being pivotally connected with said disk near its periphery at one end and also pivotally connected with an adjacent outer end of one of said plungers and the other arm pivotally connected with said disk at a point eccentrically to the aforesaid-mentioned arm at one end, and the other end extending in the longitudinal direction of said sleeves and bent at an angle and pivotally connected with the outer end of the other plunger, substantially as shown and described.

5. In a nut-cracking machine, the combination with a suitable bed of sleeves arranged in a horizontal endwise position and supporting-plates for sleeves, adjustably connected with said bed-plate; plungers in said sleeves and arms varying in length connected with the outer end portion of said plungers, one of said arms extending in the longitudinal direction of said sleeves having separate adjustably-connected parts, as and for the purpose described.

6. In a nut-cracking machine, the combination with a suitable bed-plate of sleeves arranged in a horizontal endwise position, and power-actuated plungers or jaws, having concavities in their adjacent ends in said sleeves, each plunger having a longitudinal slot in one end and a longitudinal opening extending through the other end, and a fixed rod in said opening extending beyond the concavity in said plunger, when retracted in position having a perforation in its rear end portion and a pin in said sleeve extending within the perforation in the end of said rod, substantially as and for the purpose described.

7. In a nut-cracking machine, the combination with a suitable bed-plate of sleeves arranged in a horizontal endwise position and power-actuated plungers in said sleeves, and a hood arranged above the space between the adjacent ends of said sleeves and means for connecting said hood with said sleeves, substantially as shown and described.

8. In a combined nut-cracking and nut-feeding machine, the combination with a suitable bed-plate of sleeves arranged in a horizontal endwise position and supporting-plates therefor connected with said bed-plate, and a rearwardly-extended plate connected with one of said sleeves and having a power-conveying shaft journaled thereon in a transverse direction to said bed-plates, plungers or jaws in said sleeves, means for reciprocating said plungers, and a case extending in a transverse direction to said sleeves and having one end thereof arranged in position opposite the adjacent ends of said sleeves, said case having a reciprocating block and a nut-carrying plate adapted to extend beneath the adjacent ends of said sleeves, connected with said block and power-conveying devices on said shaft connected with said block, substantially as shown and described.

9. In a combined nut cracking and feeding machine, comprising a bed having sleeves arranged in a horizontal endwise position, and reciprocating plungers, and a case extending to the adjacent ends of said sleeves, the combination of a reciprocating, nut-carrying plate having yielding fingers upon the under side thereof extending beyond the forward end of said plates, for the purpose described.

10. In a combined nut cracking and feeding machine, the combination with a suitable bed and sleeves upon said bed arranged in a horizontal endwise position and plungers in said sleeves, of a case having one end extending in the direction of and in juxtaposition to the adjacent ends of said sleeves, and a nut-carrying plate in said case arranged beneath the respective plungers when outwardly extended, and means for reciprocating said nut-carrying plate, in the manner and for the purpose described.

11. In a combined nut cracking and feeding machine, the combination with a suitable bed-plate, having sleeves arranged in a horizontal endwise position, and reciprocating plungers in said sleeves, of a case having one end extending in the direction of and in juxtaposition to the adjacent ends of said sleeves, a reciprocating guide-block within said case and a nut-carrying plate connected with said guide-block and adapted to be extended beneath said plungers when outwardly extended, and a lug on the upper edge of said guide-block above said nut-carrying plate as and for the purpose described.

12. In a combined nut cracking and feeding machine the combination with a suitable bed-plate of sleeves arranged in a horizontal endwise position, and reciprocating plungers in said sleeves, a rearwardly-extended plate connected with one of said sleeves, and a shaft in suitable bearings upon said plate, arranged in a transverse direction to said bed-plate, and a cam on said shaft, a plate extending in an upward, forward direction and connected with the bearing for said shaft, and a longitudinal slotted guide on said upwardly-extended plate and a sliding bar therein; said bar having an extended arm pivoted thereto at one end and a forked outer end engaging with said cam on said shaft and a downwardly-extended foot portion of said sliding bar, provided with a horizontally-extended link, a case having one end extending in the direction of and in juxtaposition to the adjacent ends of said sleeves, a guide-block and a nut-carrier connected with said block within said case, a lever pivoted to the outer end of said guide-block and a bell-crank lever having one end pivotally connected with the outer end of the lever on said guide-block, and a pin on the other end of said bell-crank lever, engaging with the link on the foot portion of said sliding bar and a lever for operating said shaft as and for the purpose described.

13. In a combined nut cracking and feeding machine the combination with a suitable bed-plate, having sleeves arranged in a horizontal endwise position, and reciprocating plungers in said sleeves, of a case having one end extending in the direction of the adjacent ends of said sleeves, and having reciprocating nut-carrying devices therein, and a nut-feeding tube having its lower end connected with the said case and the other end extending in an upward direction and provided with a longitudinal slot and a nut-transmitting wheel having depressions for the nuts, extending within the slot in said tubes, as and for the purpose described.

14. In a combined nut cracking and feeding machine, the combination with a suitable bed-plate, having sleeves arranged in a horizontal endwise position and reciprocating plungers in said sleeves, of a horizontal case having one end extending in the direction of the adjacent ends of said sleeves and having reciprocating nut-carrying devices therein, and a nut-feeding tube connected at its lower end with said case, and having slots in opposite sides thereof; a nut-transmitting wheel, having depressions for the nuts in one of said slots, and a flat spring connected with said tube at one end, having the other end extending within the other slot and in the direction of the periphery of said wheel, as and for the purpose described.

15. In a combined nut cracking and feeding machine, the combination with the bed-plate of sleeves arranged in a horizontal endwise position, and reciprocating plungers in said sleeves, a rearwardly-extended plate connected with one of said sleeves, and a shaft journaled therein in a transverse direction to said bed-plate, and a plate connected eccentrically with said shaft, a case having one end extending in the direction of and in proximity to the adjacent ends of said sleeves, and a receiver for the nut beneath said sleeves, and a tube having a longitudinal slot in one side thereof, extending upwardly from said case, a standard in said bed-plate, having suitable shaft-supports, and a shaft journaled in said supports in a transverse direction to the bed-plate, and near said tube a wheel upon said shaft having its periphery extended within the slot in said tube and depressions for the nuts in said periphery, a ratchet-wheel on said shaft, a horizontal supporting-bar above the shaft having the ratchet-wheel and a laterally-extended rod thereon, an oscillating bar on said rod, having a pawl at its lower end, weighted at its outer end, engaging the said ratchet-wheel, and a pawl on said rod also engaging the ratchet-wheel, a connecting-arm pivotally connected with the lower end of said oscillating bar at one end and with the eccentric plate on the said shaft, and an operating-lever connected with said shaft, substantially as shown and described.

16. In a nut cracking and feeding machine, the combination with the reciprocating nut-cracking jaws of said machine, of a tube extending downwardly in the direction of and in proximity to said jaws, having a longitudinal slot and a hopper connected with the upper end of said tube, a crank-shaft journaled on said hopper, having a nut-agitating device thereon, a standard on said machine and a shaft journaled on said standard, a wheel on said shaft having depressions in its periphery, and extending within the slot in said tube, a ratchet-wheel on said shaft, an oscillating bar pivoted to a suitable support in said standard, an arm connecting the upper end of said oscillating bar with said crank in said crank-shaft, and a pawl on the lower end of said oscillating bar engaging with the ratchet-wheel, and means for operating said oscillating bar, substantially as shown and described.

17. In a nut-cracking machine, the combination with the bed-plate having sleeves arranged in a horizontal endwise position, and plungers in said sleeves, a lever for operating said plungers, and a plate on said machine near said lever, having an adjustable stop, as and for the purpose described.

HENRY C. PFEIFFER.

Witnesses:
JOHN H. BARNES,
JENNIE WILLIAMS.